Figure 1:
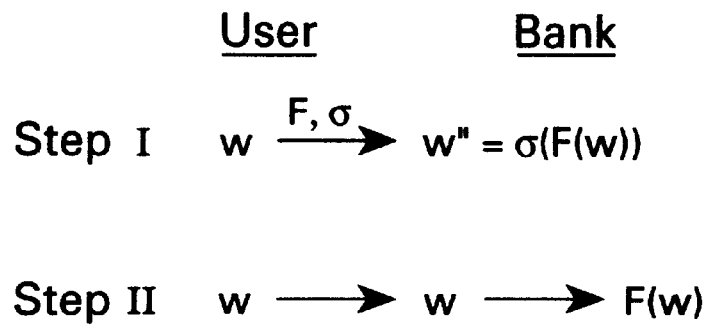

United States Patent [19]
De Rooij

[11] Patent Number: 5,924,084
[45] Date of Patent: Jul. 13, 1999

[54] METHOD FOR TRACING PAYMENT DATA IN AN ANONYMOUS PAYMENT SYSTEM

[76] Inventor: Peter Jacobus Nicolaas De Rooij, Wijnpersstraat 30/13, 3000 Leuven, Belgium

[21] Appl. No.: 08/675,826

[22] Filed: Jul. 5, 1996

[30] Foreign Application Priority Data

Jul. 6, 1995 [NL] Netherlands ............... 1000741

[51] Int. Cl.$^6$ ............... G07F 19/00; G06F 15/30; G06F 15/20; H04L 9/00
[52] U.S. Cl. ............... 705/39; 705/40; 380/24; 380/23; 380/25; 380/29; 235/380; 340/825.34
[58] Field of Search ............... 395/240; 364/406, 364/408, 401; 235/379; 380/23; 283/58, 70; 902/24; 705/39, 40

[56] References Cited

U.S. PATENT DOCUMENTS

| | | | |
|---|---|---|---|
| 4,727,243 | 2/1988 | Savar ............... | 235/379 |
| 4,993,068 | 2/1991 | Piosenka et al. ............... | 380/23 |
| 5,018,196 | 5/1991 | Takaragi et al. ............... | 380/30 |
| 5,121,945 | 6/1992 | Thomson et al. ............... | 283/58 |
| 5,287,270 | 2/1994 | Hardey et al. ............... | 364/408 |
| 5,420,926 | 5/1995 | Low et al. ............... | 380/24 |
| 5,453,601 | 9/1995 | Rosen ............... | 235/379 |
| 5,465,206 | 11/1995 | Hilt et al. ............... | 364/406 |
| 5,504,677 | 4/1996 | Pollin ............... | 364/408 |
| 5,557,518 | 9/1996 | Rosen ............... | 364/408 |
| 5,644,727 | 7/1997 | Atkins ............... | 395/240 |
| 5,675,650 | 10/1997 | Cordery et al. ............... | 380/23 |

FOREIGN PATENT DOCUMENTS

| | | |
|---|---|---|
| 0 363 122 | 4/1990 | European Pat. Off. . |
| 0 637 004 | 2/1995 | European Pat. Off. . |
| 0 666 663 A1 | 8/1995 | European Pat. Off. ............ H04L 9/18 |
| 40 03 386 | 5/1991 | Germany . |
| 41 19 924 | 12/1992 | Germany . |
| WO 93/08545 | 4/1993 | WIPO . |

OTHER PUBLICATIONS

"Strong Loss Tolerance for Untraceable Electronic Coin Systems", B. Pfitzmann, et al., Jun. 1995.
3rd International Conference on Fault–Tolerant Computing–Systems, pp. 487–497, 1987, M. Waidner, et al., "Verlust-tolerante Elektronische Brieftaschen".
Proceedings 20th International Symposium on Fault–Tolerant Computing, pp. 140–147, 1990, M. Waidner, et al., "Loss–Tolerance for Electronic Wallets".
Second International Smart Card 2000 Conference, pp. 127–151, 1991, M. Waidner, et al., "Loss–Tolerant Electronic Wallets".

Primary Examiner—Allen R. MacDonald
Assistant Examiner—Pedro R. Kanof
Attorney, Agent, or Firm—Oblon, Spivak, McClelland, Maier & Neustadt, P.C.

[57] ABSTRACT

The invention relates to a method for tracing payment data in an anonymous payment system having electronic payment means, such as so-called "smart cards". According to the invention, the user commits himself to a value (w) which may later be used for the tracing by a payment institution. The value (w) is preferably recorded with the help of a so-called one-way function (F) and an (electronic) signature ($\sigma$), so that the payment institution does not dispose of the value itself, but is able to verify it on the basis of the stored derivative (w") of the value. The invention further relates to a payment means and a payment system for application of the method.

12 Claims, 1 Drawing Sheet

METHOD FOR TRACING PAYMENT DATA IN AN ANONYMOUS PAYMENT SYSTEM

BACKGROUND OF THE INVENTION

The invention relates to a method for tracing payment data in an anonymous payment system. More in particular, the invention relates to such method in the event that payment data has been lost due to damage of the payment means or premature interruption of a transaction.

In electronic payment systems, problems may arise if a payment means, such as a payment card, is damaged or lost. Particularly in the event of payment systems with payment in advance ("prepaid payment systems"), the value stored in the payment means may then be lost. In order in such case not to put the user at a disadvantage, the payment transactions effected should be reconstructed or at least traced, in order as yet to have a fair settlement take place of the actually effected payments.

Even if a (payment) transaction is prematurely broken off, payment data may be lost, with possible adverse consequences for the user of the payment means and/or for the receiver of the payment. In this case, payment data should also be traced, in order to prevent or undo possible harm.

In the event of anonymous payment systems, i.e., payment systems in which the payments cannot afterwards be related to a certain user (payer), the problem arises that reconstructing or tracing effected payment transaction in most cases is impossible. It is specifically the anonymous nature of such payment systems which impedes transactions being traced. The users of such systems can therefore be harmed by the loss of, or damage to, their payment means.

Prior art documents, such as U.S. Pat. Nos. 5,018,196 and 4,993,068, or European Patent Applications 0 637 004 and 0 518 365, offer no solution to these problems.

SUMMARY OF THE INVENTION

It is an object of the invention to eliminate the above and other drawbacks of the prior art and to provide a method which makes it possible, in an anonymous payment system, to trace transactions and, if necessary, to reconstruct these transactions, with the anonymity of the user being protected as much as possible.

It is a further object of the invention to provide a payment system in which the above-mentioned method is applied.

For this purpose, the invention provides a method for tracing payment data in an anonymous payment system having electronic payment means and at least one payment institution designed for electronic payments, which method comprises: a first step in which the user issues a value characterising his payment data to the payment institution, which value is stored by the payment institution and, if tracing is desired, a second step in which the user releases the value, whereafter payment data is checked on the basis of the said value.

The invention is based on the insight that, for tracing lost transactions, the anonymity of the payment system must be breached, at least in part. The invention is also based on the further insight that the anonymity be preferably breached only with the co-operation of the user.

Breaching the anonymity may take place by making available, to the payment institution, information which is used by the payment means to construct a recognisable part of the (future) payments. The payment institution may analogously reconstruct such recognisable parts of the payments afterwards.

A preferred embodiment of the invention is based on the insight that it suffices for the user to commit himself to a value by issuing check information related to such value. In the first step, therefore, a check digit of the said value is advantageously recorded, instead of the value itself, with the user supplying the value itself only in the second step, or at least giving permission to use the value itself.

Preferably, the said value is blocked in the first step in such a manner that the payment institution cannot apply the value without the co-operation of the user. As a result, the anonymity of the user is maintained. On the other hand, the user commits himself to the said value by means of the check value, so that the value cannot be modified by the user.

The value is advantageously blocked, in the first step, with the help of a one-way function. By means of a one-way function, it may be achieved that the value can be checked afterwards, while the value itself cannot be determined by the payment institution. This provides a further protection of the anonymity of the user.

EXEMPLARY EMBODIMENTS

The invention will be explained in greater detail below with reference to the Figures.

FIG. 1 schematically shows an embodiment of the method according to the invention.

Figure 2:
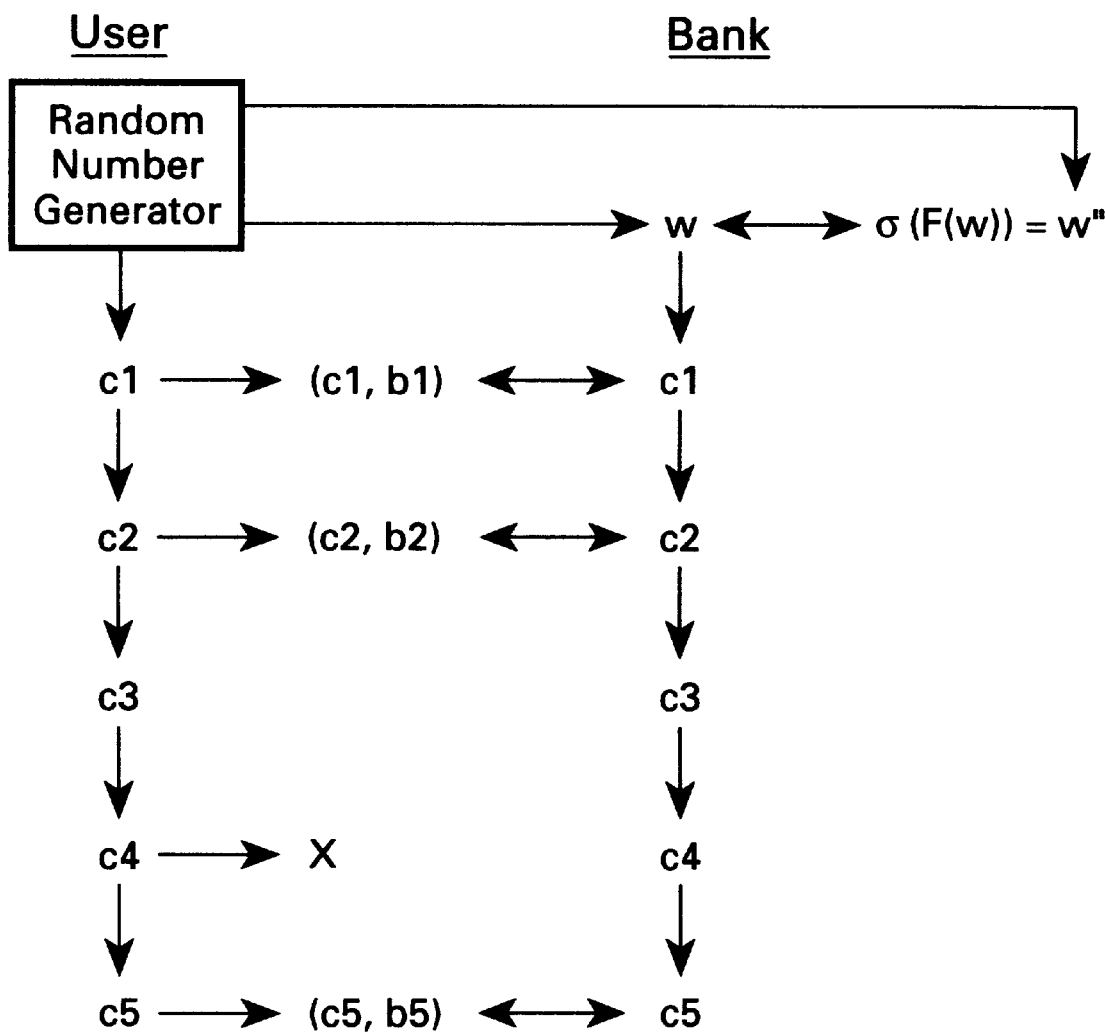

FIG. 2 schematically shows an example of the application of the method according to the invention.

The embodiment of the method according to the invention schematically shown in FIG. 1 comprises two steps. The first step, indicated by I, is preferably carried out regularly, i.e., at fixed points in time or after every n transactions ($n \geq 1$), e.g., in the event of charging a (prepaid) payment means and/or in the event of any contact with the payment institution in question. The second step, indicated by II, is carried out only if payment data was lost and must be traced afterwards.

In the first step (I), the user commits himself to a value w; in other words, the user makes a so-called "commitment" to the value w. The value w itself, e.g., is the value (status) of the random generator of the payment means in question. The said committing may take place by subjecting the value w to a one-way function and the subsequent affixing of a signature to the result of the one-way function. The application of the one-way function (F) has the advantage that the payment institution (indicated by "Bank" in FIG. 1, but institutions other than banks can also be envisaged) cannot determine w from the resulting value w' (where w'=F(w), F being the one-way function), so that the anonymity of the user is maintained. The payment institution is able to check w', however, by also calculating w' from the value w provided later. This will be explained in greater detail below.

It will be understood that a one-way function F known per se from cryptography has the property that the reciprocal ($F^{-1}$) cannot, or cannot viably, be calculated. In other words, w'=F(w) may be simply calculated from w, but it is not viable from w' to reconstruct the original value w=$F^{-1}$(w'). As a result, the one-way function provides a further protection of the user.

Affixing a (digital) signature to w' has the advantage that it can be proven, by the payment institution, that a certain user has supplied the value w in question (or w', w"). Affixing a signature to the value w', resulting in the value w", is carried out with a function σ, which may be a function known per se from cryptography. The value w", where w"=σ(w')=σ(F(w)), is stored by the payment institution.

In the second step (II), the user "opens" the value committed to. This "opening" takes place, e.g., by providing the value w to the payment institution, whereafter the payment institution can reconstruct w' as w'=F(w) and subsequently verify the signature w" on w'. The payment institution then verifies, on the basis of the values of w used in various transactions, which transactions have been carried out successfully. The opening may take place by informing the payment institution that a stored value w may be used.

A further check may be obtained if the user repeatedly provides values w" (possibly: w') to the payment institution, and the payment institution stores the i-th value (i≧1), whilst the i−1 preceding values are applied by the user only to verify the correct application of F and σ.

In fact, the method according to the invention comprises two submethods, corresponding to the said two steps: the first step comprises a method for protectedly storing reconstruction data, with the second step comprising a method for reconstructing payment data on the basis of reconstruction data.

In FIG. 2, there is schematically, and by way of example, illustrated a further elaboration of the second step of the method according to the invention.

In the first step, the payment means of the user has issued a value w"=σ(F(w)) which is related to the status of the random generator of the payment means of the user in question. If payments (in general: transactions) are to be traced or reconstructed because, e.g., a payment means was lost or a transaction was prematurely terminated, the user gives permission, in the second step, to use the value w stored at the payment institution ("Bank" in FIG. 2). In the case shown, this occurs by the user (or the payment means of the user, as the case may be) transferring the value w (stored for this purpose in the payment means) to the payment institution. As a result, the payment institution is able to verify the stored value w" by calculating w' (w'=F(w)) and checking the signature on w'.

At the payment institution, there have e.g. been received the electronic cheques Ch1, Ch2 and Ch5, represented by (c1, b1), (c2, b2) and (c5, b5) respectively. In this example, it is assumed that the cheque Ch3 was never issued and that the transaction with the cheque Ch4 was broken off (represented by X in FIG. 2) due to a technical failure. It should be noted that instead of cheques other types of electronic payments, e.g. electronic coins, may be used as well.

The payment information consists, inter alia, of an identification ci (c1, c2 or c5), which is related to the status of the said random generator at the time of the "writing out" of the respective cheque, and an amount bi (b1, b2, b5). On the basis of the value w, the successive values ci (i=1 . . . 5) are now generated anew by the payment institution. On the basis of the value ci, the cheques Ch1, Ch2 and Ch5 may be traced, i.e., recognized as cheques of the user in question. Since the beneficiary of the payment communicates the amount to the payment agency, the amounts b1, b2, b5 are known to the payment institution as well.

This embodiment of the method may be applied for indemnifying the user in the event of loss or technical failure. On the basis of recognised (traced) payments, the difference between the sum of the paid amounts and the balance of the payment means at the moment of issuing the (derivative of the) value (w") may be repaid to the user.

In the event that a payment is broken off prematurely, the method according to the invention may be applied to detect whether indeed a interrupted transaction was involved. If this was not the case, the payment may be traced. Here, the first step of the method may possibly be dispensed with; the user may immediately release the value. The payment means may possibly provide additional information on transactions gone wrong or broken off.

A payment system in which the invention is applied comprises at least a payment institution (such as a bank, credit card company, or possibly telecommunications company), payment stations (such as cash registers of sales points designed for that purpose) and users having payment means (such as payment cards, "smart cards"). During a payment transaction, there is basically no direct connection required between a payment station and a payment institution. Such connection is advantageously set up only periodically, in order to settle transactions effected.

On the basis of the tracing of transactions according to the invention, i.e., the verification whether the transactions in question have taken place, the transactions effected may possibly be reconstructed as well. The payment transactions discussed above may take place with so-called electronic cheques.

It will be understood by those skilled in the art that the invention is not limited to the embodiments discussed above, and that many modifications and additions are possible without departing from the scope of the present invention.

I claim:

1. A method for tracing payment data in an anonymous payment system, the payment system having an electronic payment means associated with each particular user and a payment institution, comprising:

establishing an identity value associated with each particular user and his electronic payment means;

using each electronic payment means for deriving payment identification values from the identity value for making electronic payment transactions with the associated electronic payment means;

deriving a modified value from the identity value that does not reveal the identity of the particular user and transmitting the modified value to the payment institution;

storing the modified value transmitted by each particular user at the payment institution; and permitting tracing of successfully completed electronic payment transactions by a particular electronic payment means when an associated particular user causes the transmitting of the identity value to the payment institution, said tracing comprising, verifying the transmitted identity value by deriving a second modified value from the received identity value, comparing the derived second modified value with the previously stored modified value, and identifying successfully completed electronic payment transactions associated with the particular payment means by further deriving tracing payment identification values from the verified transmitted identity value.

2. The method according to claim 1, wherein the deriving of the modified value is done by using at least a one-way function.

3. The method according to claim 1, wherein the deriving of the modified value is done by using at least a digital signature function.

4. The method according to claim 1, wherein the deriving of the modified value is done by using at least a one-way function and a digital signature function.

5. The method according to claim 1, further comprising carrying out said tracing after a request by the payment institution.

6. The method according to claim 1, wherein the establishing of the identity value includes establishing an included money value.

7. The method according to claim 1, further comprising carrying out the deriving of the modified value and the transmitting thereof to the payment institution for storage after every n electronic payment transactions, where $n \geq 1$.

8. The method according to claim 1, further comprising recording amounts corresponding with the tracing payment identification values.

9. The method according to claim 8, further comprising the step of refunding the user with the difference between the sum of any paid amount at the moment of issuing the modified value and the balance remaining after deductions based upon traced fully successful electronic payment transactions associated with the user of the particular payment means.

10. A payment device for use with a payment institution in an anonymous payment system, the payment device comprising:

an integrated circuit portion arranged for driving payment identification values for making electronic payment transactions from a first value stored by a portion of the integrated circuit portion, said first value being configured to permit the identity of an associated user of the payment device to be derived therefrom;

means for deriving a second value from the first value and for transferring the second value to said payment institution, said second value being configured to prevent the identity of the associated user from being derived therefrom without said first value; and further means for transferring said first value to the payment institution when a request is initiated and when the associated user agrees to the transfer of said first value.

11. The payment means according to claim 10, wherein the means for driving the second value from the first value uses a one-way function and/or a digital signature function.

12. A method for tracing payment data in an anonymous payment system having an electronic payment means associated with each particular user for making electronic transactions and at least one payment institution, comprising:

establishing an identity value associated with each particular user and his particular electronic payment means to enable electronic transactions to be conducted by the particular user with his particular electronic payment means, said identity value being provided in a modified form to protect the anonymity of the particular user to the payment institution for storage thereat; and performing tracing and detecting of successful transactions involving a particular electronic payment means upon the associated particular user releasing said associated identity value to the payment institution permitting the identity of the particular user to be established using said stored modified form, wherein the releasing of the identity value is performed after a transaction is prematurely broken off to enable the detecting of successful transactions.

* * * * *